United States Patent [19]  [11]  4,258,775
Samoto  [45]  Mar. 31, 1981

[54] PNEUMATIC RADIAL TIRE WITH ZERO DEGREE DAMPER LAYERS BETWEEN BELT PLIES

[75] Inventor: Masao Samoto, Kunitachi, Japan

[73] Assignee: Bridgestone Tire Company Limited, Tokyo, Japan

[21] Appl. No.: 942,259

[22] Filed: Sep. 14, 1978

[30] Foreign Application Priority Data

Sep. 16, 1977 [JP] Japan .................. 52-110446

[51] Int. Cl.³ .................. B60C 9/20; B60C 15/06; B60C 9/02
[52] U.S. Cl. .................. 152/361 R; 152/361 DM; 152/362 R; 152/354 R
[58] Field of Search ..... 152/361 R, 361 FP, 361 DM, 152/362 R, 354 R

[56] References Cited

U.S. PATENT DOCUMENTS 3,386,487  6/1968  Massoubre .................. 152/361 DM
4,120,338  10/1978  Mirtain .................. 152/362 R X
4,139,040  2/1979  Samoto et al. .................. 152/362 R

FOREIGN PATENT DOCUMENTS 2201623  7/1972  Fed. Rep. of Germany ...... 152/361 R

Primary Examiner—William A. Powell
Assistant Examiner—Lois E. Rodgers
Attorney, Agent, or Firm—Sughrue, Rothwell, Mion, Zinn and Macpeak

[57] ABSTRACT

A pneumatic radial tire including a tread, a pair of sidewalls, bead portions having bead wires therein and fiber cord radial carcass extending between the bead portions through the sidewalls and the tread, and a belt layer of plural metal cord layers above the carcass in the tread, the metal cords lying in radial planes of the tire. At least one rubber coated damper layer is positioned between belt plies in ends of the belt layer with cords arranged in directions substantially 90° to the radial planes or 0° to circumferential planes. The tire according to the invention further comprises high elastomeric rubber fillers having a 20% extension modulus of at least 30 kg/cm² extending from the bead wires to the center zones of the sidewalls. The tire according to the invention is capable of preventing "standing waves" to thereby improve the durability of the tire for high speed travelling.

10 Claims, 2 Drawing Figures

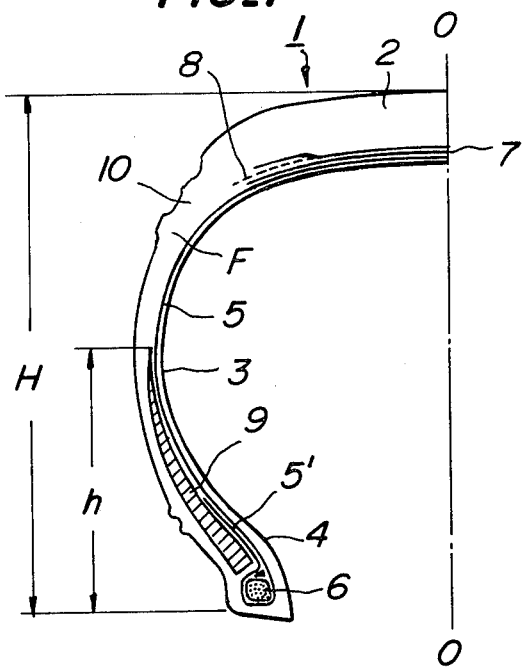
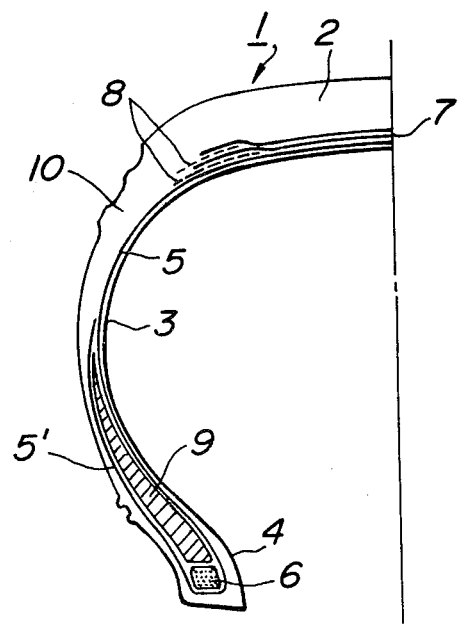

PNEUMATIC RADIAL TIRE WITH ZERO DEGREE DAMPER LAYERS BETWEEN BELT PLIES

BACKGROUND OF THE INVENTION

1. Field of the Invention

The present invention relates to a pneumatic radial tire including a reinforcing belt of metal cords in a tread superior in durability at high speeds. More particularly it relates to a pneumatic radial tire including a center annular tread, a pair of sidewalls extending from ends of said tread and bead portions including a fiber cord radial carcass extending between the bead portions and having ends folded about the bead portions and affixed thereat. A belt layer is positioned of a plurality of metal cord layers above the carcass in the tread, of which metal cords are at angles 65°–80° to radial planes including a rotating axis of the tire and cross to the metal cords in the outer metal cord layers.

2. Description of the Prior Art

It has previously been suggested to reinforce a radial tire by a belt layer arranged on a carcass in a tread consisting of a plurality of metal cord layers with the cords at angles of 65°–80° to radial planes of the tire and crossed to the cords in other cord layers. Such a radial tire is superior in wear-resistance. However, it has been recognized that such a radial tire is not suitable for high speed driving because the tread is much heavier than that including a belt of fiber cord layers which frequently cause standing waves. During operation at low speeds, a deformation of a tread at a contact surface may be immediately restored by means of the tires inner pressure as soon as the deformed portion of the tread is out of contact with the road. However, when travelling at a higher speed, the centrifugal force may become sufficiently great so as to overcome the inner pressure until the centrifugal force causes waves at the deformed portion which propagate along the circumference of the tread. Such a phenomenon is referred to as "standing waves". When standing waves occur, heating rapidly increases to give rise to a peeling failure from heating, so that use of the tire is limited to lower speeds at which the standing wave will not be caused.

In order to avoid standing waves and to improve high speed performance, tires have been suggested in which a few of plies of fiber cords are wound such as nylon cords circumferentially over the entire width or a center zone or both ends of the outer periphery of metal belt layers to restrain the extension of the metal belt layers when travelling at high speeds.

The inventor of the invention of the present application has confirmed experimentally that such a construction for restraining the metal belt layers by the fiber cord layers remarkably improves the high speed performance but is unsatisfactory for preventing the standing waves. The inventor further noticed that as above described, standing waves result from incomplete restoration of the deformed tread in contact with the road and accordingly that it is advantageous for the tire that the effects of deformation of the tread be reduced. Upon further investigation of this consideration, the inventor surprisingly found that damper layers provided between belt plies of the ends of a belt layer serve to prevent standing waves as the result of reduced shearing strains in the belt plies above and under the damper layers. More over, there also results a remarkable increase in the restraining effect of the belt by the addition to the damper layers of high elastomeric rubber fillers reinforcing the zones from bead portions to the centers of the sidewalls which thereby not only further increases the deformation restraining effect on the belt layers but also the entire tire in conjunction with the damper layers so that the durability of the tire travelling at high speeds is remarkably improved.

SUMMARY OF THE INVENTION

The present invention resides in the above discussed discovery. According to a first aspect of the invention, a pneumatic radial tire includes at least one rubber-coated damper layer positioned between belt plies in ends of the belt layer along with cords arranged in directions substantially 90° to the radial planes.

According to a second aspect of the invention, the pneumatic radial tire further comprises high elastomeric rubber fillers tapered in section radially outwardly having a 20% extension modulus of at least 30 kg/cm$^2$ extending from near the bead wires to center zones of the sidewalls.

In order that the invention may be more clearly understood, a preferred embodiment will now be described, by way of example, with reference to the accompanying drawings.

BRIEF DESCRIPTION OF THE DRAWINGS

FIG. 1 is a sectional view of one half of a tire according to the invention; and FIG. 2 is a sectional view of one half of a tire of another embodiment of the invention.

DETAILED DESCRIPTION OF THE PREFERRED EMBODIMENT

FIG. 1 illustrates a left half of a tire 1 in section according to the invention. The tire 1 shown in FIG. 1 includes a tread 2, sidewalls 3, bead portions 4 and a carcass 5 consisting of cloth layers of fiber cords such as polyester, rayon or nylon extending between the bead portion 4 and a bead portion (not shown) in the right side of a mid circumferential line O—O to reinforce the tire as a whole. The cords are arranged radially or parallel to radial planes including a rotating axis of the tire. The carcass 5 shown in the drawing consists of one fiber cord layer. However, it may consist of a plurality of layers or the cords may be arranged at slight angles, for example, less than 10° to the radial planes such that the cords in separate layers cross to each other. A belt layer 7 of two metal cord layers is arranged on the carcass 5 over the entire width of the tread 2. The metal cords in separate cord layers cross to each other and are at angles 65°–80° to the radial planes of the tire and approach in the circumferential direction so as to reinforce the entire tread of the tire.

Ends of the carcass 5 extend around bead wires 6 in the bead portions 4 and further extend along the carcass 5 toward the sidewalls 3 to form carcass folded portions 5'. High elastomeric fillers 9 of relatively hard rubber are provided on the outside of the carcass 5 and carcass folded portions 5' serve to reinforce these regions.

The first essential feature of the present invention is the provision of one or more rubber-coated damper layers 8 positioned or sandwiched between the belt plies in the ends of the metal belt layer 7 and including cords extending substantially at 90° to the radial planes. The cord layers of the damper layers 8 may be fiber cord layers such as nylon, rayon, polyester and fiber B (trade name of aromatic polyamide fiber available from E. I. du Pont) or metal cord layers as the case may be. If a unitary damper layer is sandwiched between the belt plies, the belt would often be deformed asymmetrically by stresses between the layers. Accordingly, in a complete tire separate damper layers are provided in the ends of the belt layer between the ends of the metal belt layers. The width of the damper layer in each end of the belt is preferably 10-35% of the belt width hence, the separate layers are axially spaced. The end of the damper layer extends somewhat beyond the end of the belt layer but as shown in the figures, not to the portion 10.

In the embodiment shown in FIG. 1, a single damper layer is positioned between the belt plies in the end of the belt layer. However, two or more damper layers may be provided if desired. In the embodiment shown in FIG. 2, one or more damper layers may be positioned between the belt layer and the carcass in addition to the layers between the belt plies. Furthermore, an additional cord layer (not shown) may be provided on the belt layer to form a damper layer other than between the belt plies. It is of course possible to provide damper layers between the belt plies and between the belt layer and carcass and an additional cord layer on the belt layer to form a damper layer as a whole. The arrangement of these damper layers should be determined taking into consideration the size and use conditions of the tires. For a damper layer of more than two layers, the thicknesses and the numbers of cords in different layers may be changed. As above described, the width of the damper layer in each end of the belt is preferably 10-35% of the belt width. The respective ends of the damper layer are preferably in alignment with each other.

The second essential feature of the present invention is the provision of a tapered high elastomeric filler of very hard rubber extending from the proximity of the bead wire to approximately the center zone of the sidewall, the rubber having a 20% extension modulus of at least 30 kg/cm$^2$, preferably 45-65 kg/cm$^2$ on the outside or between the carcass 5 and carcass folded portion 5' to reinforce this zone.

According to the invention, a vertical distance h from the bottom of the bead portion to the top of the rubber filler is more than one third of the vertical distance H from the bottom of the bead portion to the top of the tread. In order to more improve the high speed performance of the tire, the value of h/H is preferably $\frac{1}{2}$ and more preferably more than $\frac{1}{3}$ to limit a flexible zone F of the outer rubber to a narrower area as the case may be.

In the embodiment as shown in FIG. 1, the carcass folded portion 5' is entirely in substantially direct contact with the carcass 5 and the high elastomeric rubber filler 9 is arranged on the outside of the carcass folded portion 5'.

In the other embodiment as shown in FIG. 2, the high elastomeric rubber filler 9 is positioned in a space between the carcass 5 and carcass folded portion 5'.

Tires of size 195/70 HR14 having various constructions were fabricated for the purpose of testing their high speed performance, particularly durability, at high speeds. Each tire included a carcass having one ply with polyester cord layer of 1500d/2 and belt layer having two plies arranged on the carcass over the entire width of the tread such that steel cords of the plies are at an angle of 71° to the radial plane and crossed with the steel cords of the other ply. The rubber filler is so arranged that its bottom is adjacent to the bead wire and its upper end extends to a position such that h/H=0.5.

The construction of the tires which were tested is specified in Table 1. The tire was mounted on a rim of size 5$\frac{1}{2}$J and were filled with air to a pressure of 2.1 kg/cm$^2$. The tire was preliminarily run on a metal drum having a diameter of 1.7 m under a load of 525 kg at a room temperature of 38° C. at a circumferential speed of 80 km/hour for two hours. After the preliminary running, the tire was left as it was for three hours. Then the tire was again run, this time at a speed of 121 km/hour for 30 minutes. After ascertaining that the tire was running under the normal condition, tire was run at 129 km/hour for 30 minutes. In this manner, the tire was run at stepwise increased speeds with 8 km/hour per step every 30 minutes. The results are shown in Table 1.

TABLE 1

| Tire | Arrangement of damper layer | Position of rubber filler (Construction of bead portion) | 20% extension modulus of high elastomeric rubber filler | Result Speed (km/hour) - time (minute) |
|---|---|---|---|---|
| A | One layer between belt plies | Between carcass and folded portion | 12 kg/cm$^2$ | 217-25 (Broken) |
| B | One layer between belt plies | Between carcass and folded portion | 55 kg/cm$^2$ | 241-30 (Ran the whole distance) |
| C | One layer between belt plies and one layer between layer and carcass | Between carcass and folded portion | 55 kg/cm$^2$ | 241-30 (Ran the whole distance) |
| D | One layer on belt layer | Between carcass and folded portion | 12 kg/cm$^2$ | 185-16 (Broken) |
| E | One layer on belt layer and one layer between belt layer and carcass | Between carcass and folded portion | 12 kg/cm$^2$ | 185-21 (Broken) |

As can be seen from Table 1, the tires B and C according to the invention did not exhibit any abnormal condition after having run at 15 step speeds from 121 km/hour to 241 km/hour for 8 hours. The inventor has ascertained that the surprisingly improved high speed performance of the tire according to the invention with its remarkably reduced shearing strains in the upper and lower belt plies and increased belt restraining effect is brought about by provision of the damper layers at the ends of the belt and by reinforcing the areas from the bead portions to the center zones of the sidewalls with the super high modulus rubber fillers, which reduce standing waves effectively in combination with the damper layers and rubber fillers.

In contrast herewith, the tire A having bead portions including rubber fillers of the conventional modulus exhibited peeling failures in overall tread rubber when travelling at the twelfth speed, 217 km/hour, because it is affected by deformation of the sidewalls at high speeds even if provided with the damper layers between belt plies. With the tire D, including rubber fillers of the conventional modulus in the bead portions and damper layers on the belt layer without any damper layers between belt plies, and the tire E, including damper layers on the belt layer and between belt layer and the carcass, considerable standing waves occurred resulting in peeling failures at the eighth speed, 185 km/hour.

As above described, the pneumatic tire according to the invention, which is reinforced in the end zones of the belt layer or those zones and further zones from the bead portions to the centers of the sidewalls, is able to restrain the formation of standing waves during high speed travelling. Particularly, the tire according to the invention, reinforced in the end zones of the belt layer and the zones from the bead portions to the centers of the sidewalls, does not produce any discomfort due to vibrations when travelling due to its narrowed flexible zones with the aid of the high elastomeric rubber fillers having the inherent high damping capacity. Accordingly, the tire according to the invention is remarkably superior in high speed performance and very high in utility value.

Although there has been shown and described specific embodiments, it is to be clearly understood that the same were merely for the purpose of illustration, and that changes and modifications may readily be made therein by those skilled in the art without departing from the spirit and scope of the invention.

What is claimed is:

1. A pneumatic radial tire including a central annular tread, a pair of sidewalls extending from ends of said tread and bead portions including bead wires, and further including a fiber cord radial carcass extending between said bead portions and having ends folded about said bead portions and affixed thereat, and a belt layer having a plurality of metal cord layers above said carcass in said tread, said metal cord layers having cords at angles 65°–80° to radial planes including a rotating axis of the tire and wherein said cords from layer to layer are crossed to each other, said tire comprising at least one pair of rubber coated damper layers positioned between ends of belt metal cord layers in said belt layer and axially spaced apart and having cords arranged in directions substantially 90° to said radial planes, an end of said damper layer extending somewhat beyond the end of said belt layer.

2. A pneumatic radial tire as set forth in claim 1, wherein at least one pair of additional damper layers are provided at a location on said belt layer in addition to said damper layers between said belt layers.

3. A pneumatic radial tire as set forth in claim 1, wherein said damper layer at ends of the belt is arranged over 10–35% of a width of said belt.

4. A pneumatic radial tire including a central annular tread, a pair of sidewalls extending from ends of said tread and bead portions including bead wires, and further including a fiber cord radial carcass extending between said bead portions and having ends folded about said bead portions and affixed thereat, and a belt layer having a plurality of metal cord layers above said carcass in said tread, said metal cord layers having cords at angles of 65°–80° to radial planes including a rotating axis of the tire and wherein said cords from layer to layer are crossed to each other, said tire comprising at least one pair of rubber coated damper layers positioned between ends of said belt metal cord layers and axially spaced apart and having cords arranged in directions substantially 90° to said radial planes, an end of said damper layer extending somewhat beyond the end of said belt layer, and high modulus elastomeric rubber fillers tapered in section radially outwardly having a 20% extendion modulus of at least 30 kg/cm$^2$ extending from in proximities of said bead wires to center zones of said sidewalls.

5. A pneumatic radial tire as set forth in claim 4, wherein said folded portions of said carcass are spaced from the carcass itself in a direction of rotating axis of the tire to form spaces therebetween in which said high modulus elastomeric rubber fillers are arranged.

6. A pneumatic radial tire as set forth in claim 4, wherein said folded portions of said carcass are in substantially directly contact with the carcass and said high modulus elastomeric rubber fillers are arranged on said folded portions axially outward thereof.

7. A pneumatic radial tire as set forth in claim 4, wherein at least one pair of additional damper layers are provided at a location on said belt layer in addition to said damper layers between said belt layers.

8. A pneumatic radial tire as set forth in claim 4, wherein said damper layer at ends of the belt is arranged over 10–35% of a width of said belt.

9. A pneumatic radial tire as set forth in claim 1, wherein at least one pair of additional damper layers are provided between said belt layer and said carcass in addition to said damper layers between said belt layers.

10. A pneumatic radial tire as set forth in claim 4, wherein at least one pair of additional damper layers are provided between said belt layer and said carcass in addition to said damper layers between said belt layers.

* * * * *